UNITED STATES PATENT OFFICE.

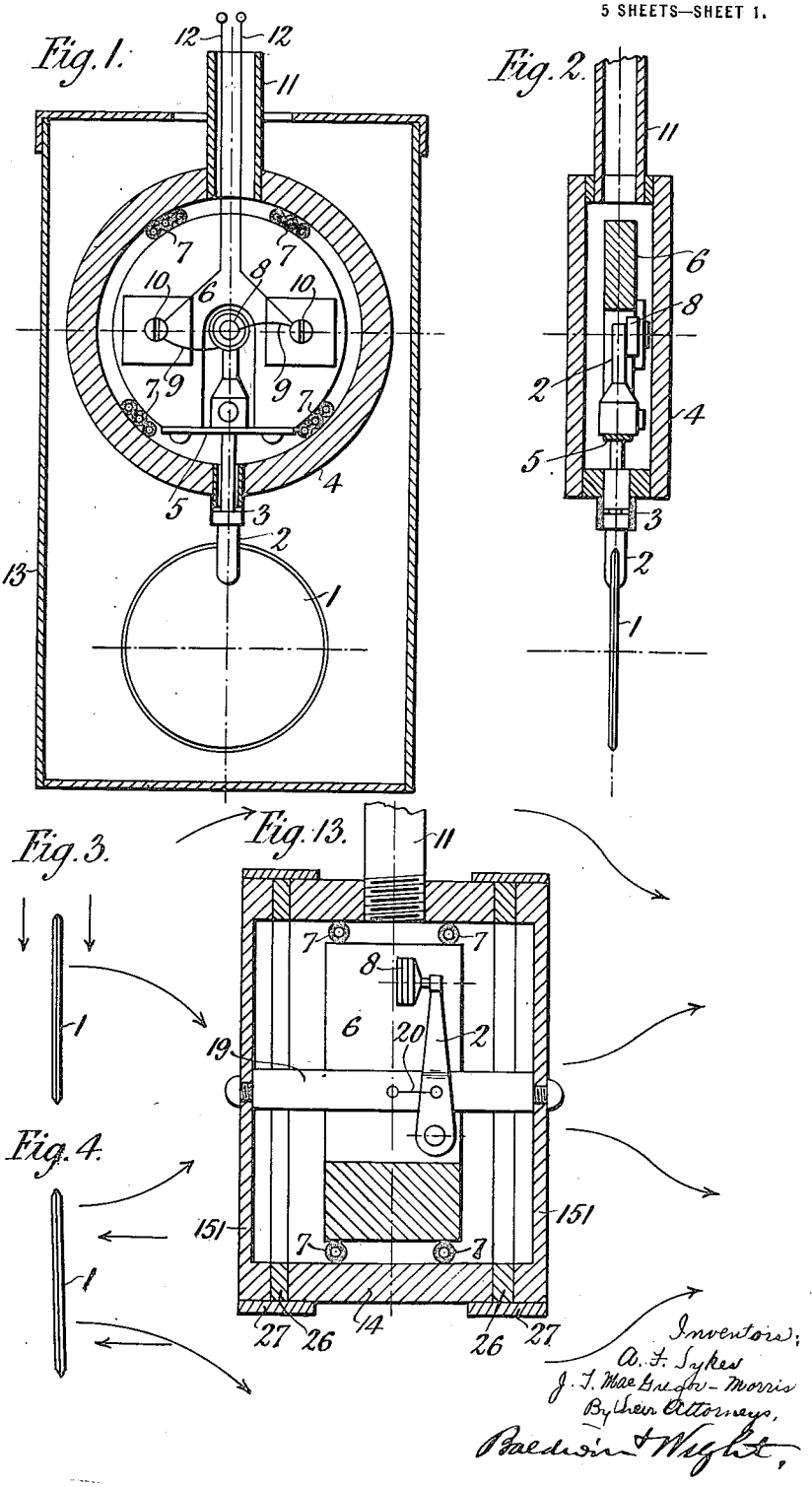

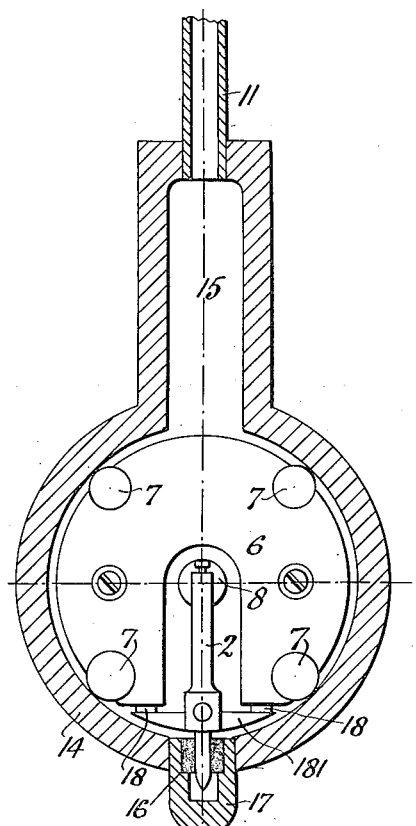
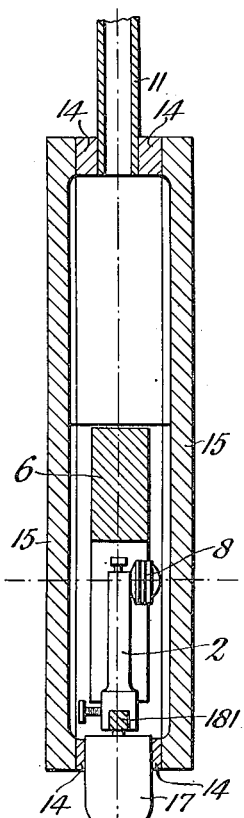
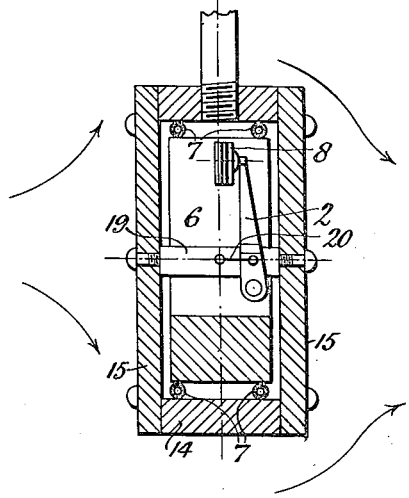
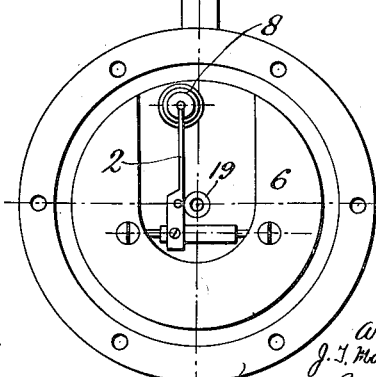

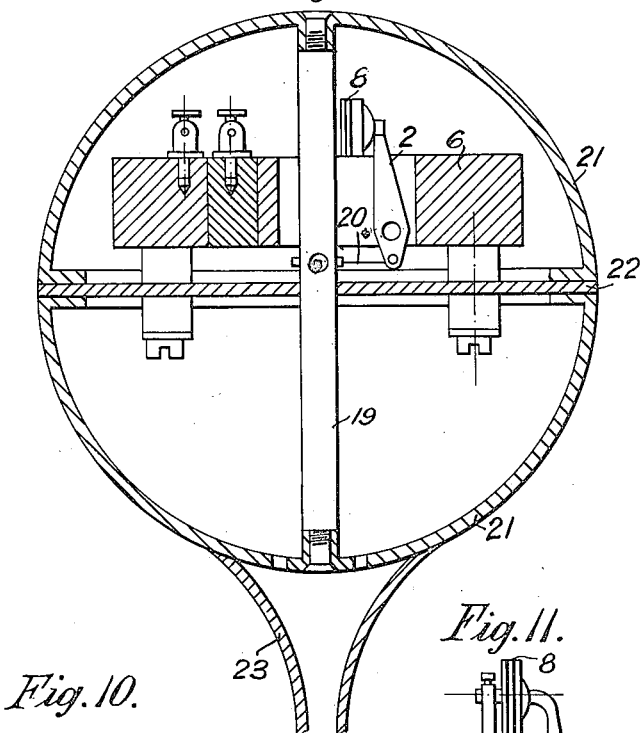
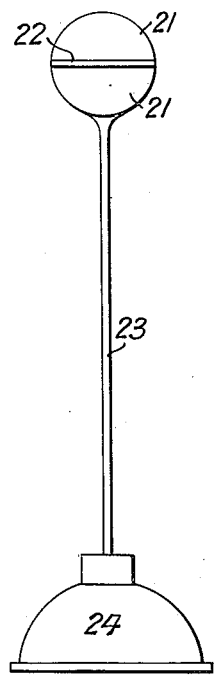
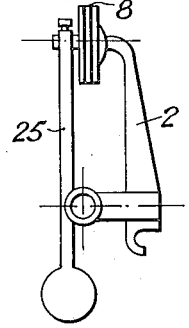
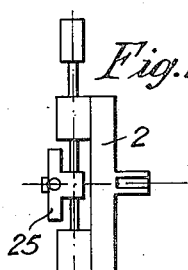

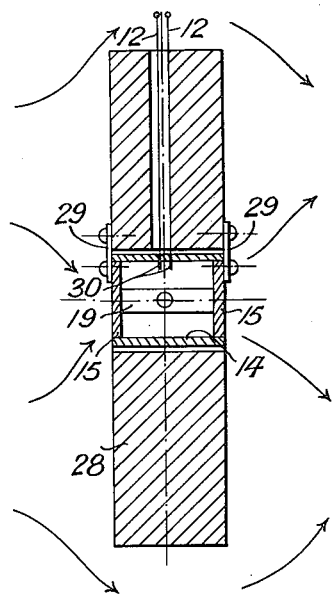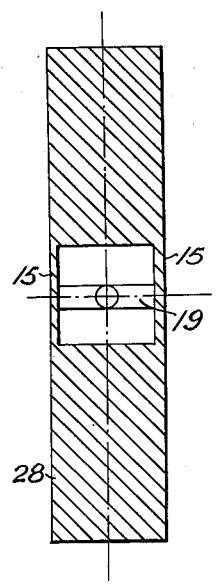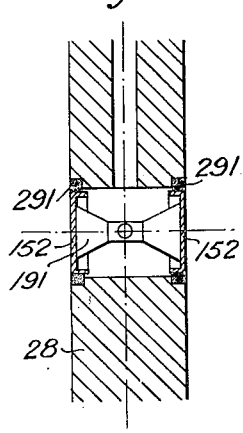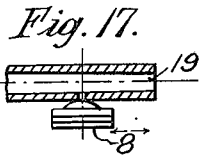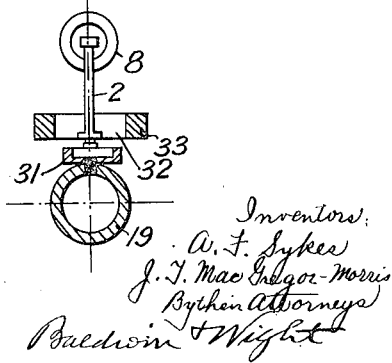

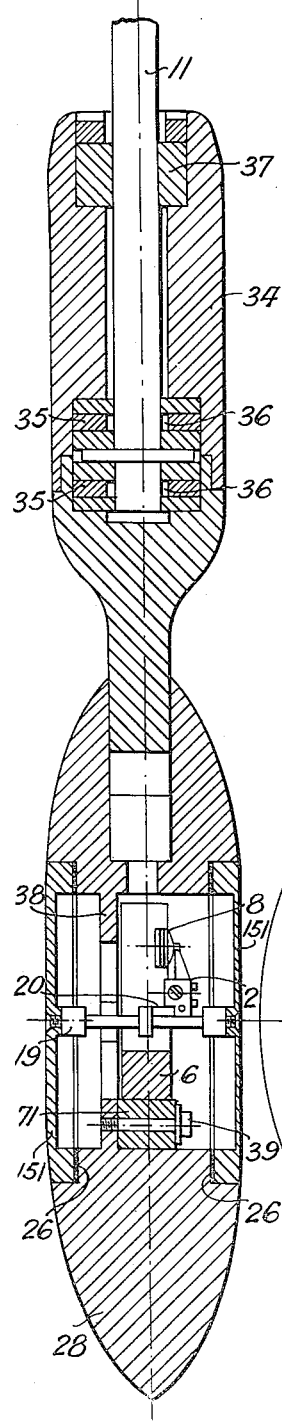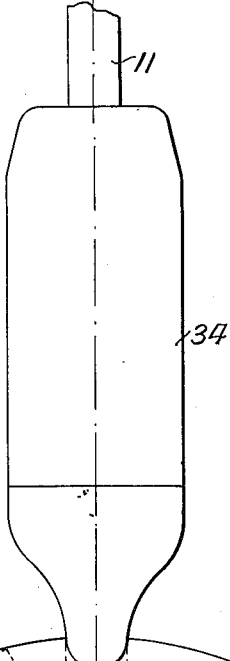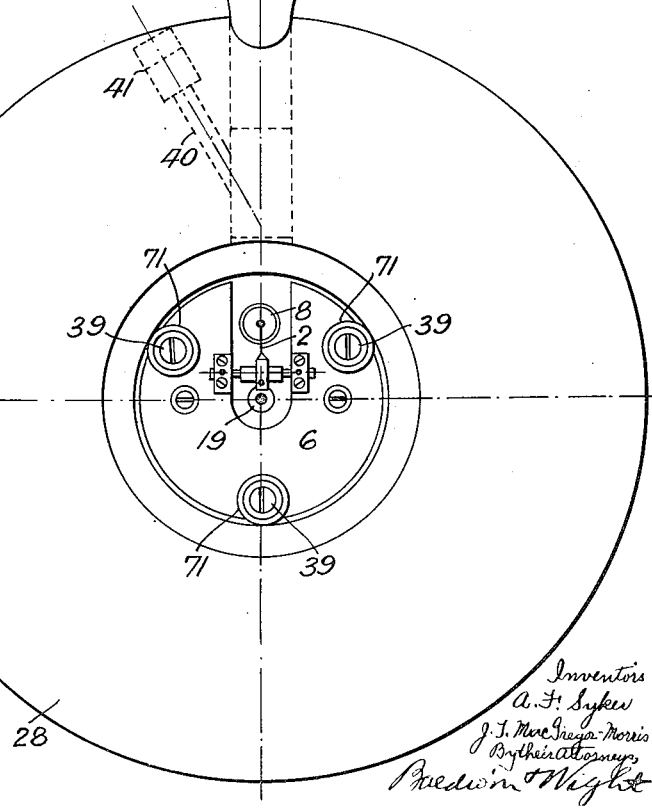

ADRIAN FRANCIS SYKES, OF NEW BARNET, AND JOHN TURNER MacGREGOR-MORRIS, OF HAMPSTEAD, LONDON, ENGLAND.

MEANS FOR DETECTING AND LOCATING SUBAQUEOUS SOUNDS.

1,360,330.

Specification of Letters Patent. Patented Nov. 30, 1920.

Application filed February 12, 1919. Serial No. 276,582.

*To all whom it may concern:*

Be it known that we, ADRIAN FRANCIS SYKES, a subject of the King of Great Britain, residing at Lorne Villa, New Barnet, Herts, England, and JOHN TURNER MACGREGOR-MORRIS, a subject of the King of Great Britain, residing at 3 Lyndhurst road, Hampstead, London, England, have invented new and useful Improved Means for Detecting and Locating Subaqueous Sounds, of which the following is a specification.

This invention relates to the detection of sound in water by the vibration of a body immersed therein and to means for augmenting the motion of the said body. It further consists in apparatus whereby the oscillation induced by the sound is either in fact or in effect reduced according to the direction of the incident sound.

By an immersed body we mean in this specification a body so immersed that the water can act upon two opposite faces thereof, that is, if the body is so orientated that one face is normal and opposed to the direction of propagation of the sound waves, the waves have access not only to that face but to the opposite face.

Thus we immerse a body in the water and detect vibration by any known means, but we prefer to use a microphone. We combine a microphone and an immersed body in such a fashion that the apparatus only responds to differences of pressure occurring externally, that is, between one side of the instrument and the other. Our apparatus operates by the force derived from the momentum of the particles of the water; it is insensitive to the vibration of pressure occurring at any one point in the normal transmission of a sound wave.

Preferably the microphone is mounted upon a mass which is acoustically insulated from the immersed body relative to which such body moves. In some cases, however, the microphone itself can be acoustically insulated without the use of an independent mass.

To explain our invention better we proceed to outline briefly the action of sound on a body immersed in the medium transmitting the sound. The propagation of a wave through a medium such as water, involves a rapid variation of pressure and velocity at any given point. A body so immersed in the liquid is slightly varied in volume owing to the changes of pressure; with this effect we are not concerned; in all the apparatus presently to be described we seek to insure that any changes in the volume of the body immersed shall be without effect on the detecting mechanism. To the extent that the body possesses size the pressure is not uniform over the whole; thus a difference of pressure will occur tending to induce motion in the direction in which the sound is traveling. Moreover, if the body, by virtue of inertia or other impedance, tends to resist motion, a larger difference of pressure is created. It is of course understood that when we refer to pressure we mean the instantaneous divergence from the mean pressure. Hence it will be seen that an immersed body tends to vibrate in the direction in which the sound is proceeding and not at all in a direction at right angles thereto. A body such as a disk of some suitable metal obstructs the sound much less in the edge-on position than when it receives the sound on the face.

If a microphone shielded by a case from external influence is operated by the disk referred to above, the response of the microphone varies according to the direction of the incident sound.

In developing our apparatus we have found it desirable to reduce the density of the immersed body. This may be done either by the use of solids whose density is naturally low, such as wood or paraffin wax; but preferably we employ a metallic body which is hollow so as to obtain a low apparent density. The detecting agent is located within the cavity, thereby obviating the need for a separate case and flexible connection, which are undesirable if it is possible to dispense with them.

Great care is taken in the design of the immersed body to insure that the microphone is operated from a point which does not change in position in response to variations in pressure provided that this pressure variation is not due to the impact of the water.

Any body can be used as a detector subject to certain precautions. Thus, if the immersed body is a spherical shell sufficiently rigid to avoid uncertain vibrations in the body itself, direction can be found by the provision of artificial means for eliminating all components of vibration at right angles to a given direction, thus forming what may be called a direction microphone. This we do by interposing a link between the vibrating body and the microphone, or by such other device adapted to the same end such as levers with very unequal moduli of resistance or crossed pivots. Furthermore, it is very desirable mechanically to couple together points on a diameter and to take the vibration from the coupling.

In a further developed form we make up the immersed body by combining two plates and a ring. By using thin plates and mechanically connecting their centers, the action of the apparatus is localized and the results augmented. The reason for this is that the portion which responds to the impact of the sound is of low apparent density and forms an easier path for the sound.

To increase still further the inherent sensitiveness of the instrument we make use of the conception of an aperture in an acoustically opaque screen. It can be shown theoretically that the amplitude of the vibration in the vicinity of the free passage is greater than in the disturbed wave. Accordingly we immerse a body in a hole in a screen of dense material and thereby obtain an increased response.

The body may be a disk or a hollow body and is preferably flexibly supported in the hole. Generally we close entirely the hole by two plates or diaphragms and connect mechanically their center points so that they are constantly constrained to vibrate in phase and constitute in effect a single body. A number of such units may be arranged in a single screen.

When sharp tuning of the vibrating system is required, the immersed body is in a metallic contact with the screen; but where response is objectionable rubber washers are interposed between the screen and the immersed body.

When the water is flowing past the locator from whatever cause, it may so happen that the form of the instrument or the delicate nature thereof may render screening unnecessary. In such a case we inclose the instrument in an acoustically transparent shield filled with water, and provide means for rotating the instrument within the shield. In an elaborate form the shield is torpedo-shaped suitable for being towed, and the orientation of the instrument situated within is changed according to the strength of an electric current.

Our invention is illustrated by the accompanying drawings which show various forms of instrument constructed in accordance with our invention.

Figures 1 and 2 are sections at right angles to one another of one form. Figs. 3 and 4 are diagrams illustrating the action of sound waves upon the disk.

Figs. 5 and 6 are sections at right angles to one another of an instrument in which the mass and microphone are contained within the detecting body.

Figs. 7 and 8 are a transverse section and a side view with one plate removed of an instrument which may be regarded as a development of that shown in Figs. 5 and 6.

Figs. 9 and 10 show a different form of apparatus. Figs. 11 and 12 show details, and Figs. 13 to 16 are transverse sections of modified forms of instrument.

Figs. 17 and 18 show details.

Figs. 19 and 20 are a front view and section of a modified form of instrument.

In Figs. 1 and 2 the detecting body is a disk 1 attached to a lever 2 passing up through a flexible sleeve 3 which connects it to a case 4. The lever is attached by means of a spring strip 5 to a mass 6 which is acoustically insulated from the case 4 by a group of rubber tubes 7. At the upper end of the lever is mounted a microphone 8 from which fine conducting wires 9 lead to terminals 10 carried by the mass. The case is supported by a tube 11 by means of which the instrument can be rotated in the water in which it is immersed and which also serve to contain the electric leads 12 supplying currents to the microphone. Sound waves impinging on the disk edge-on, as illustrated in Fig. 3, cause much less vibration and much less sound in the microphone than when they strike the face of the disk as in Fig. 4. In this case therefore the directive action is determined by the shape of the immersed body.

The whole is contained in a shield 13 which is acoustically transparent and is filled with water. This screen shields the disk from the direct impact of the water while permitting the sound to pass through.

In Figs. 5 and 6 the detecting body is formed of a banjo shaped ring 14 with two cover plates 15 connected together. The mass 6 is as before acoustically insulated by rubber 7 and to it is attached the lever 2 which is also connected to the body by means of a rubber bush 16 carried by a fitting 17 at the bottom of the body. The connection between the mass and the lever consists of two metallic leaves 18 secured to the mass and to a cross bar 181 fixed to the lever. When the apparatus is immersed in water transmitting sound it oscillates chiefly as a whole in the direction to which the sound is being propagated. If the sound strikes the apparatus in a direction at right angles to the cover plates 15 motion occurs in that direction, and as the lever 2 is free to move in that direction the microphone 8 responds loudly. On the other hand, when the sound impinges on the instrument edge-on, as the lever is very difficult to vibrate in that direction, the response of the microphone is feeble. There is no significance in the shape of the immersed body drawn, the directive action being largely determined by the interior mechanism.

In Figs. 7 and 8 the ring 14 is cylindrical and the two side plates are connected together at their centers by a strut or tie-bar 19, (which may be formed of a tube). From a point on this bar, preferably the center point, a wire or link 20 transmits vibrations to a lever 2 which is torsionally pivoted to the mass 6, which as before is acoustically insulated from the ring 14. This lever actuates the microphone 8. Under favorable conditions the lever magnifies the vibrations of the bar 19 and thus the response of the microphone. As the lever is connected by a torsion pivot to the mass, which is acoustically insulated from the ring, the microphone can only be influenced by vibration transmitted through the connecting link 20. This link has the property of transmitting only components of vibration in the direction of its length; hence when the instrument vibrates in response to the sound the resolved part of the vibration in the direction of the connecting link alone affects the microphone. Thus the microphone gives a loud response when the outer surfaces of the plates 15 are at right angles to the direction of propagation of the waves.

In Figs. 9 and 10 the detecting body is formed of two hollow hemispheres 21 connected together by a diametrical plate 22 and supported on a flexible stalk 23 rising up from a base 24, adapted to rest at the bottom of the sea. The mass 6 is mounted on the diametrical plate through the center of which passes a strut or tie-bar 19 to which the lever 2 is connected by a link as before. The instrument oscillates as a whole in the direction in which the sound is being propagated. The sound produced in the microphone due to the impact of the sound waves is a maximum when such waves are traveling in the direction of the link 20 and is a minimum, that is, practically zero when the direction of propagation is at right angles thereto. In this case the back of the microphone is preferably carried by a counterbalanced arm 25 which is connected by a pivot to the lever 2, which in its turn as before is pivoted to the mass 6 as shown in Figs. 11 and 12.

Fig. 13 shows another form of instrument which may be looked upon as a development of that shown in Figs. 7 and 8. The ring 14 is closed by two cover plates 151, rubber rings 26 being interposed between the plates and the rings. The plates are recessed so as to be more flexible at their centers than at their peripheries. 27 are rings covering the junctions between the parts so as to render the whole watertight. Sound striking the apparatus broadside on evades, as indicated by the arrows, the parts less free to move, and concentrates on the centers of the plates where the maximum sensitiveness occurs. The vibration induced largely exceeds in amplitude the motion of the water in the unobstructed wave. Thus the instrument, itself inherently discriminative owing to the disposition of the material, is rendered still more so by the directive link 20. The minimum of sound can be discovered with great precision.

Fig. 14 shows an instrument in which the principle of concentrating the sound waves, as described with reference to Fig. 13, is extended. 28 is a massive slab of dense material which is immersed in the water and has in it a hole in which the detecting body is located. This body consists of a ring 14 and two side plates 15 connected together by a strut or tie-bar 19. The body is specifically light and is flexibly attached to the slab by spring strips 29. The electric leads 12 pass down through a hole in the slab and are sealed into the ring 14 by insulating plugs 30.

Fig. 15 shows a very similar instrument. In this case the slab is formed in two halves and the side plates 15 are actually part of the slab.

Fig. 16 shows a slightly modified form of the instrument shown in Fig. 14. In this case the immersed body consists of two flanged plates 152 connected together by a light hollow tube 191 with coned ends. The body is supported by two rubber rings 291 let into grooves formed in the slab around the hole.

In the three forms of instrument shown in Figs. 14, 15 and 16 the microphone may be supported directly by the strut or tie-bar 19 as shown in Fig. 17.

Fig. 18 shows a method by which the vibrations of the strut or tie-bar are mechanically amplified before they reach the microphone. The strut 19 carries a diaphragm 31 on which is mounted the microphone actuating lever 2 which passes through and carries another diaphragm 32 which itself carries a comparatively heavy ring 33. Vibrations of the strut 19 are imparted to the diaphragm 31 and therefore to the lever 2, which accordingly rocks about the point where it passes through the diaphragm 32, this point being held steady by the inertia of the ring 33.

The action of the apparatus comprising the combination of a heavy mass and an immersed body is as follows:—

In the broadside position the influence of the screen or slab is such that the flow of sound concentrates on the immersed body, while in the edge-on position the slab shields the immersed body from the sound. Hence the direction in which the sound is being propagated is readily discovered. As in all the examples previously described, the alternations of pressure at any given point incidental to the transmission of the sound wave is without effect on the mechanism situated within the immersed body; the instruments only respond to external differences of pressure.

Figs. 19 and 20 show a more developed form of the instrument illustrated in Figs. 14 to 16. In this case the slab 28 is somewhat of a lenticular form. It is connected to the supporting tube 11 by a holder 34 containing a number of rubber washers 35 inclosing air spaces 36, and has at its upper end a gland 37. By this means the slab 28 is acoustically insulated from the tube 11. The immersed body is equivalent to that described with reference to Fig. 13. The mass 6 is here carried by three rubber plugs 71 which are secured by bolts 39 to a ring 38 formed in the slab; by tightening these bolts the rubber plugs can be extended to hold the mass as tightly as is desired. The electric leads are introduced through a side tube 40 and a packed gland 41.

What we claim is:—

1. In means for detecting and locating subaqueous sounds, the combination of a body having both sides thereof immersed, a mass acoustically insulated therefrom, a microphone carried by the mass and means whereby the microphone is caused to respond to vibrations of the body.

2. Apparatus for detecting and locating subaqueous sounds, consisting of a hollow body having two opposite sides connected to vibrate in unison exposed to the water and means located within the body for detecting the vibrations thereof.

3. In means for detecting and locating subaqueous sounds, the combination of a hollow body, an acoustically insulated mass within the body, a microphone carried by the mass and means for transmitting vibrations from the body to the microphone and for preventing components of vibrations at right angles to a given direction from affecting the microphone.

4. In means for detecting and locating subaqueous sounds, the combination of a ring, two plates secured one on either side thereof, an acoustically insulated mass within the ring, a microphone carried by the mass and means for transmitting vibrations from the plates to the microphone.

5. In means for detecting and locating subaqueous sounds, the combination of a ring, two plates secured one on either side thereof, a tiebar connecting the plates, an acoustically insulated mass within the ring, a microphone carried by the mass and means for transmitting vibrations from the tiebar to the microphone.

6. In means for detecting and locating subaqueous sounds, the combination of two plates mechanically coupled together, a ring separating them, an acoustically insulated mass and means for detecting vibrations of the plates and for mechanically eliminating certain components thereof.

7. In means for detecting and locating subaqueous sounds, the combination of two plates, a tiebar connecting them together, a ring separating the plates and a microphone mounted on the tiebar.

8. In means for detecting and locating subaqueous sounds, the combination of a slab of dense material having in it a hole, a pair of plates closing the hole, a tiebar coupling the plates together and means for detecting the vibrations of the tiebar.

9. In means for detecting and locating subaqueous sounds, the combination of a slab of dense material having in it a hole, a pair of plates closing the hole, a tiebar coupling the plates together and a microphone carried by the tiebar.

10. In means for detecting and locating subaqueous sounds, the combination of a slab of dense material having in it a hole, a pair of plates closing the hole, elastic material separating the plates from the slab, a tiebar coupling the plates together and means for detecting the vibrations of the tiebar.

11. In means for detecting and locating subaqueous sounds, the combination of a slab of dense material having in it a hole, a pair of plates closing the hole, a tiebar coupling the plates together, a mass acoustically insulated from the slab, a microphone carried by the mass and means whereby the vibrations of the tiebar actuate the microphone.

12. Apparatus for detecting and locating sounds comprising means responsive to sound waves in the direction of their travel, detecting means operated thereby, the body of said detecting means being acoustically insulated from said first-mentioned means, and means capable of transmitting components of vibrations to said detecting means in one direction only.

13. Apparatus for detecting and locating sounds comprising means responsive to sound waves in the direction of their travel, detecting means operated thereby, the body of said detecting means being acoustically insulated from said first-mentioned means and mechanical means capable of transmitting components of vibrations to said detecting means in one direction only.

14. Apparatus for detecting and locating subaqueous sounds, consisting of a body having two opposite sides exposed to the water, means for detecting the vibrations thereof, and means for conducting vibrations to said detecting means which conducting means is capable of transmitting components of vibrations in one direction only.

In testimony that we claim the foregoing as our invention we have signed our names this twenty-fifth day of January, 1919.

ADRIAN FRANCIS SYKES.
JOHN TURNER MacGREGOR-MORRIS.